(12) United States Patent
Miles

(10) Patent No.: US 11,110,743 B2
(45) Date of Patent: Sep. 7, 2021

(54) BICYCLE HUB STRUCTURE

(71) Applicant: TIEN HSIN INDUSTRIES CO., LTD., Taichung (TW)

(72) Inventor: Jason Miles, Taichung (TW)

(73) Assignee: TIEN HSIN INDUSTRIES CO., LTD, Taichung (TW)

( * ) Notice: Subject to any disclaimer, the term of this patent is extended or adjusted under 35 U.S.C. 154(b) by 92 days.

(21) Appl. No.: 16/693,464

(22) Filed: Nov. 25, 2019

(65) Prior Publication Data

US 2021/0155038 A1    May 27, 2021

(51) Int. Cl.
*B60B 27/04*    (2006.01)
*F16D 41/36*    (2006.01)
*F16D 27/01*    (2006.01)

(52) U.S. Cl.
CPC ............ *B60B 27/047* (2013.01); *F16D 41/36* (2013.01); *F16D 27/01* (2013.01)

(58) Field of Classification Search
CPC .......... F16D 41/24; F16D 41/26; F16D 41/36; F16D 27/01; B60B 27/047; B60B 27/023
See application file for complete search history.

(56) References Cited

U.S. PATENT DOCUMENTS

| 9,212,708 | B2* | 12/2015 | Spahr | B60B 27/047 |
| 2009/0255774 | A1 | 10/2009 | Hsu | |
| 2012/0285785 | A1* | 11/2012 | Tho | B60B 27/023 |
| | | | | 192/64 |
| 2014/0062164 | A1* | 3/2014 | Spahr | B60B 27/0047 |
| | | | | 301/6.9 |
| 2014/0110208 | A1* | 4/2014 | Braedt | F16D 41/36 |
| | | | | 192/46 |

* cited by examiner

*Primary Examiner* — Mark A Manley
(74) *Attorney, Agent, or Firm* — WPAT, PC

(57) ABSTRACT

A bicycle hub structure includes: a hub body including a first clutch ring, a sprocket support body connecting to the hub body and including a second clutch ring, first magnets and a magnetic ring. The magnetic ring is disposed on an axial side of the second clutch ring far away from the hub body, and the first magnets are disposed on a side of the second clutch ring adjacent to the magnetic ring. The sprocket support body includes a first state and a second state. In the first state, the first magnets and the magnetic ring attract the first clutch ring, so that the first clutch ring is in contact with the second clutch ring, and in the second state, a magnetic attracting force of the first magnets and the magnetic ring on the first clutch ring is less than that in the first state.

16 Claims, 15 Drawing Sheets

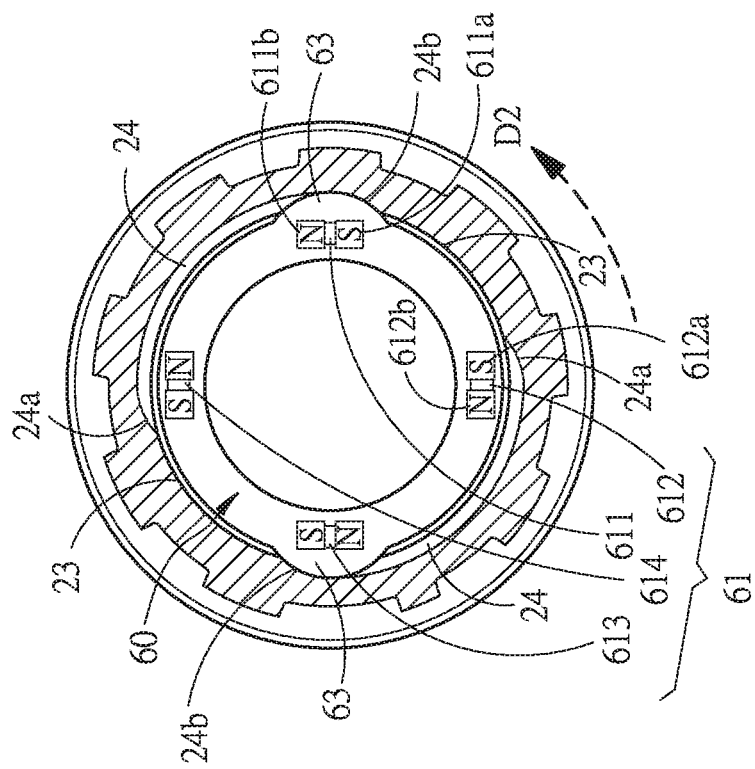
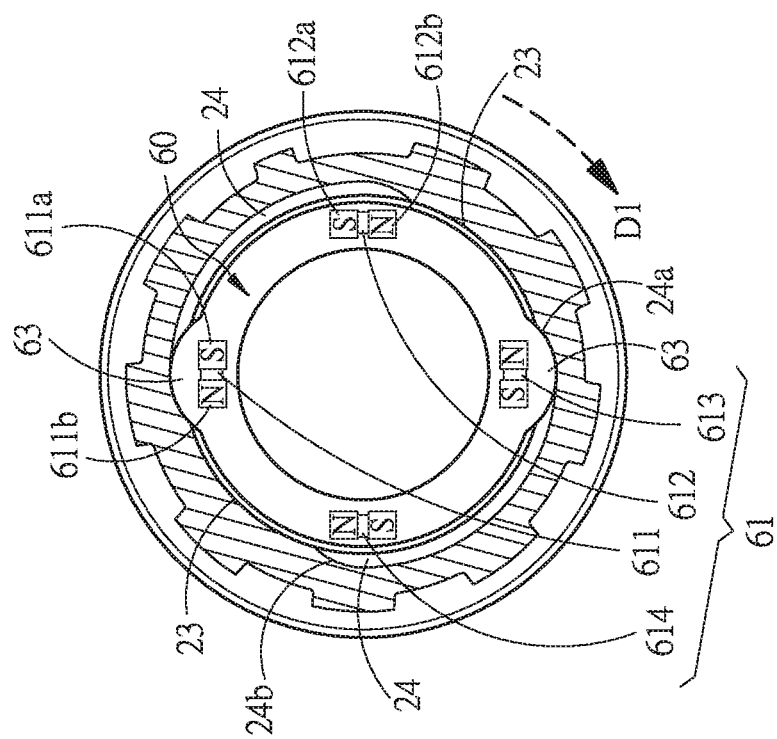

BICYCLE HUB STRUCTURE

BACKGROUND

Technical Field

The present disclosure relates to a bicycle hub, and in particular, to a clutch-type bicycle hub structure.

Related Art

Currently, in a known American patent US2009/0255774A1, a ratchet gear device for a bicycle rear frame, referring to FIG. 1 and FIG. 2, includes a wheel hub axle and a hub 1 mounted on the wheel hub axle. A ratchet gear device 2 includes a freewheel 3, a collar 4, a ratchet ring 5 and a permanent magnet 6 mounted around the wheel hub axle. A center hole of the freewheel 3 is sleeved on the wheel hub axle, and the freewheel 3 includes an inner surface in a direction facing the hub 1 and a plurality of wedging teeth are annularly arranged on the inner surface of the freewheel 3, where the plurality of wedging teeth a protrude from the inner surface. The collar 4 is magnetic, an external thread 7 is formed around a periphery of the collar 4 and is firmly screwed with a thread portion of the hub 1, and engaging teeth 8 adjacently connected are annularly arranged on an inner periphery of the collar 4 concavely and convexly. The ratchet ring 5 may be magnetic, is mounted on the wheel hub axle, and includes an inner side, an outer side and an external surface, where continuous engaging slots 9 are annularly arranged on the external surface of the ratchet ring 5 concavely and convexly, and the engaging slots 9 engages the engaging teeth 8 of the collar 4. A plurality of ratchet teeth b annularly arranged in the outer side of the ratchet ring 5 facing a direction of the freewheel 3, where the plurality of ratchet teeth b protrude from the outer side of the ratchet ring 5 and engages the wedging teeth a of the freewheel 3, to be rotated by the freewheel 3. The permanent magnet 6 is annularly sleeved on the wheel hub axle, and is mounted in the collar 4. The permanent magnet 6 is mounted at the inner side of the ratchet ring 5, to control the ratchet teeth b of the ratchet ring 5 to engage the wedging teeth a of the freewheel 3.

In this way, when pedals of a bicycle are trodden in reverse, chains of the bicycle drive the freewheel 3 to rotate in a counterclockwise direction, the wedging teeth a of the freewheel 3 push aside the ratchet teeth b of the ratchet ring 5, enable the ratchet ring 5 to move inward along a direction of the wheel hub axle, and push the permanent magnet 6 inward with the movement of the ratchet ring 5 to move out of the collar 4.

When the pedals of the bicycle are not trodden, that is, when the freewheel 3 stops rotating, the collar 4 and the ratchet ring 5 provide a magnetic attracting force to the permanent magnet 6 to attract the permanent magnet 6 into the collar 4, and the permanent magnet 6 pushes the ratchet ring 5 back to enable the ratchet teeth b of the ratchet ring 5 to engage the wedging teeth a of the freewheel 3.

When the pedals of the bicycle are trodden to move forward the bicycle, the wedging teeth a of the freewheel 3 engages the ratchet teeth b of the ratchet ring 5, to drive the ratchet ring 5 to rotate, the engaging slots 9 of the ratchet ring 5 engage the engaging teeth 8 of the collar 4, and the collar 4 is screwed with the hub 1, so that the collar 4 can drive the hub 1 of the bicycle to rotate, to drive wheels of the bicycle to rotate forward.

However, when the pedals of the bicycle are trodden in reverse, although the permanent magnet 6 is pushed out of the collar 4 and moved inward to the wheel hub axle by the ratchet ring 5, because the collar 4 and the ratchet ring 5 are magnetic, the magnetic attracting force attracts the permanent magnet 6, so that the ratchet teeth b of the ratchet ring 5 is in contact with the wedging teeth a of the freewheel 3. Therefore, wear problems between elements cause friction and noise.

SUMMARY

A main purpose of the present disclosure is to provide a bicycle hub structure, to resolve a defect that, in a ratchet gear device for a bicycle rear frame in the related art, when pedals of a bicycle are trodden in reverse, wear problems between elements cause friction and noise.

To achieve the foregoing purpose, the present disclosure provides a bicycle hub structure, including: a hub body, including a first clutch ring; a sprocket support body, connecting to the hub body and including a second clutch ring, a plurality of first magnets and a magnetic ring, where the magnetic ring is disposed on an axial side of the second clutch ring far away from the hub body, and the plurality of first magnets are disposed on a side of the second clutch ring adjacent to the magnetic ring; and a hub axle, passing through the hub body and the sprocket support body, and having a plurality of bearings disposed between the hub axle and both the hub body and the sprocket support body. A first torque transmission mechanism is disposed between the second clutch ring and the sprocket support body, and a second torque transmission mechanism is disposed between the first clutch ring and the second clutch ring. A third torque transmission mechanism is disposed between the first clutch ring and the hub body. The sprocket support body includes a first state and a second state. In the first state, the first magnets and the magnetic ring may attract the first clutch ring, to enable the first clutch ring to engage the second clutch ring, so that torque may be transmitted from the sprocket support body to the hub body through the second clutch ring and the first clutch ring; and in the second state, a magnetic attracting force of the first magnets and the magnetic ring on the first clutch ring is less than that in the first state.

Optionally, the plurality of first magnets are equidistantly and annularly disposed on the side of the second clutch ring adjacent to the magnetic ring, a plurality of second magnets are equidistantly and annularly disposed on the magnetic ring, and the plurality of first magnets and the plurality of second magnets are disposed opposite to each other.

Optionally, polarities of two adjacent ends of two adjacent first magnets are different, and polarities of two adjacent ends of two adjacent second magnets are different.

Optionally, in the first state, the plurality of first magnets and the plurality of second magnets exert repelling forces against each other, and the plurality of first magnets and the plurality of second magnets attract the first clutch ring to engage the second clutch ring, to form the second torque transmission mechanism.

Optionally, in the second state, the plurality of first magnets and the plurality of second magnets exert attracting forces on each other, and the plurality of first magnets and the plurality of second magnets do not attract the first clutch ring.

Optionally, at least one first convex portion and at least one accommodating groove are disposed on an inner periphery edge of the sprocket support body, at least one second convex portion is disposed on the magnetic ring, and the second convex portion of the magnetic ring is disposed in the at least one accommodating groove of the sprocket support body.

Optionally, when observing from a direction from the sprocket support body to the hub body, when the sprocket support body rotates in a counterclockwise direction, relative to the hub body, the first convex portion of the sprocket support body pushes the second convex portion of the magnetic ring to rotate for a radial displacement, so that the sprocket support body changes from the first state to the second state.

Optionally, a rotation direction of the sprocket support body is opposite to a rotation direction of the hub body.

Optionally, when observing from a direction from the sprocket support body to the hub body, when the sprocket support body rotates in a clockwise direction, relative to the hub body, the first convex portion of the sprocket support body pushes the second convex portion of the magnetic ring to rotate for a radial displacement, so that the sprocket support body changes from the second state to the first state.

Optionally, a rotation direction of the sprocket support body is the same as a rotation direction of the hub body.

Optionally, an assembly ring is disposed on the hub body, and a periphery of the assembly ring is connected with an inner periphery of the hub body.

Optionally, the assembly ring includes a first axial length, the first clutch ring includes a second axial length, and the first axial length of the assembly ring is greater than the second axial length of the first clutch ring.

Optionally, an internal tooth ring is disposed on the inner periphery of the sprocket support body, a plurality of splines are disposed on the second clutch ring, the plurality of splines engage the internal tooth ring to form the first torque transmission mechanism, a plurality of first ratchet teeth are disposed on an axial side of the first clutch ring facing the sprocket support body, a plurality of second ratchet teeth are disposed on an axial side of the second clutch ring facing the hub body, the plurality of first ratchet teeth engage the plurality of second ratchet teeth to form the second torque transmission mechanism, a plurality of external ratchet teeth are disposed on a periphery of the first clutch ring, a plurality of internal ratchet teeth are disposed on an inner periphery of the assembly ring, and the plurality of external ratchet teeth engage the plurality of internal ratchet teeth to form the third torque transmission mechanism.

Optionally, the second clutch ring includes a first ring body close to the first clutch ring and a second ring body close to the magnetic ring, the first ring body includes an axial side facing the hub body, the second ring body includes another axial side opposite to the axial side, and the plurality of splines are annularly disposed on radial peripheries of the first ring body and the second ring body.

Optionally, the first magnets are disposed on the second ring body.

Optionally, a sleeve is sleeved on a periphery of the hub axle, the first clutch ring, the second clutch ring and the magnetic ring are sleeved on the sleeve, and a friction element is disposed between the magnetic ring and the sleeve.

In this way, when pedals of a bicycle are trodden forward, the sprocket support body is driven to rotate in a clockwise direction, to drive the hub body to rotate with the sprocket support body. In this case, the first magnets of the second clutch ring and the second magnets of the magnetic ring exert repelling forces against each other, an N pole of the first magnets is opposite to an N pole of the second magnets, and an S pole of the first magnets is opposite to an S pole of the second magnets, so that there are more magnetic lines through the first clutch ring. Therefore, magnetic forces of the first magnets of the second clutch ring and the second magnets of the magnetic ring attract the first clutch ring, so that the first clutch ring axially moves to the second clutch ring, and the first ratchet teeth engage the second ratchet teeth of the second clutch ring, so that the sprocket support body drives the hub body to rotate, to drive wheels of the bicycle to rotate forward.

When the pedals of the bicycle are not trodden, the sprocket support body is not driven by chains and stops rotating, and the hub body keeps rotating because of inertia and drives the bicycle to move forward. In this case, the second ratchet teeth of the second clutch ring are separated from the first ratchet teeth of the first clutch ring because of the tooth structure of the second ratchet teeth.

When the pedals of the bicycle are trodden in reverse, the sprocket support body is driven to rotate in a counterclockwise direction, and the sprocket support body and the hub body rotate in reverse. In this case, the second convex portion of the magnetic ring is pushed by the first convex portion of the sprocket support body, the second magnets and the first magnets exert attracting forces on each other, the N pole of the first magnets is opposite to the S pole of the second magnets, and the S pole of the first magnets is opposite to the N pole of the second magnets, so that there are less magnetic lines through the first clutch ring. Therefore, the magnetic force attracting the first clutch ring to the second clutch ring is reduced, so that when the first ratchet teeth of the first clutch ring are pushed by the second ratchet teeth of the second clutch ring and are separated apart, a contact is not restored because of a magnetic attraction, thereby reducing contacts between the first ratchet teeth of the first clutch ring and the second ratchet teeth of the second clutch ring, and reducing noise and wear generated by friction between the first ratchet teeth of the first clutch ring and the second ratchet teeth of the second clutch ring.

BRIEF DESCRIPTION OF THE DRAWINGS

FIG. 9A and FIG. 9B are schematic diagrams of a position at which the magnetic ring is assembled in a sprocket support body according to the present disclosure.

DETAILED DESCRIPTION

Detailed content and technical descriptions of the present disclosure are further described by using embodiments, but it should be understood that, the embodiments are merely examples for descriptions, and should not be explained as any limitation on the embodiments of the present disclosure.

Figure 3A:
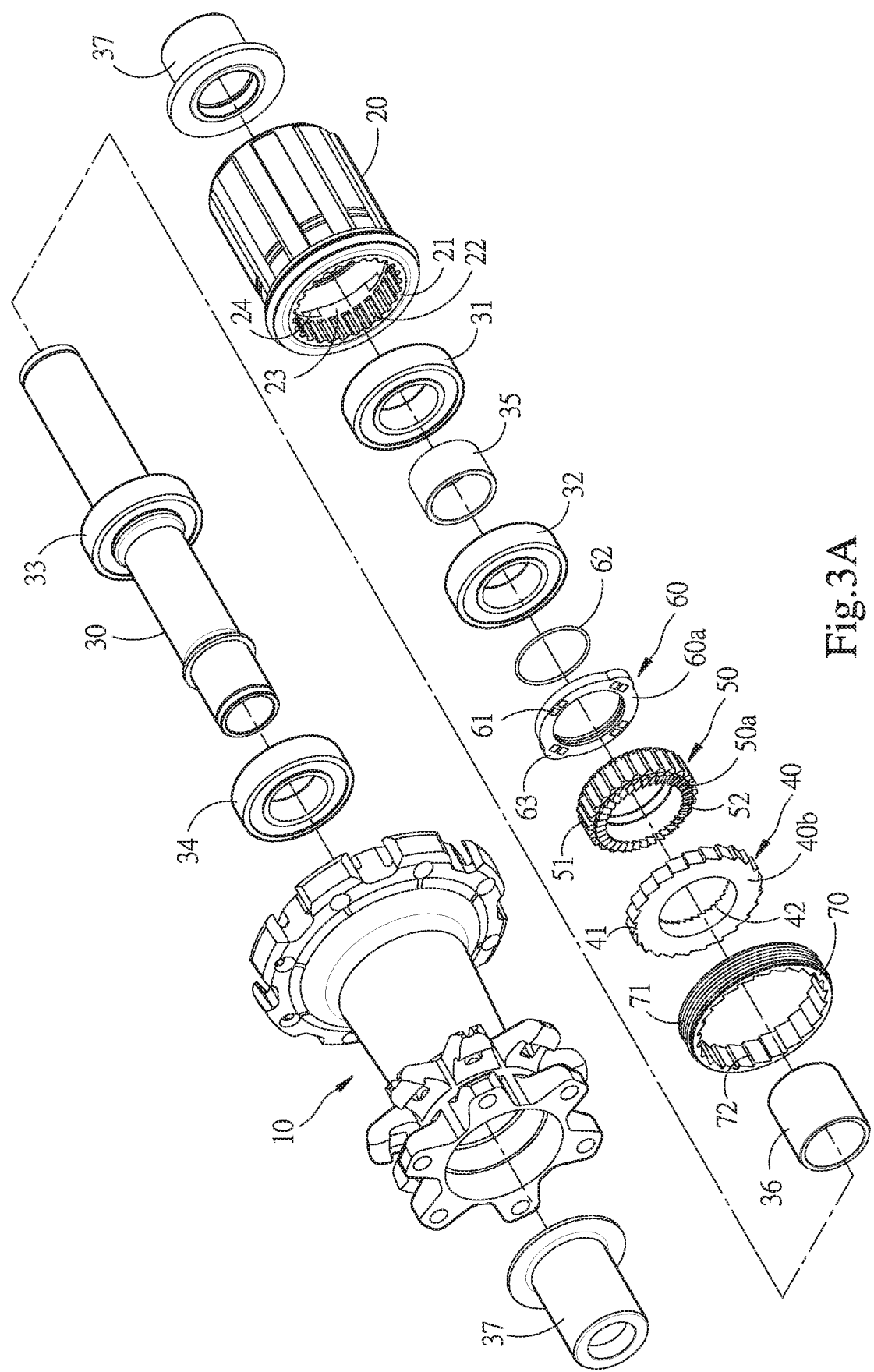
FIG. 3A is an exploded stereo view according to a first embodiment of the present disclosure.
Figure 3B:
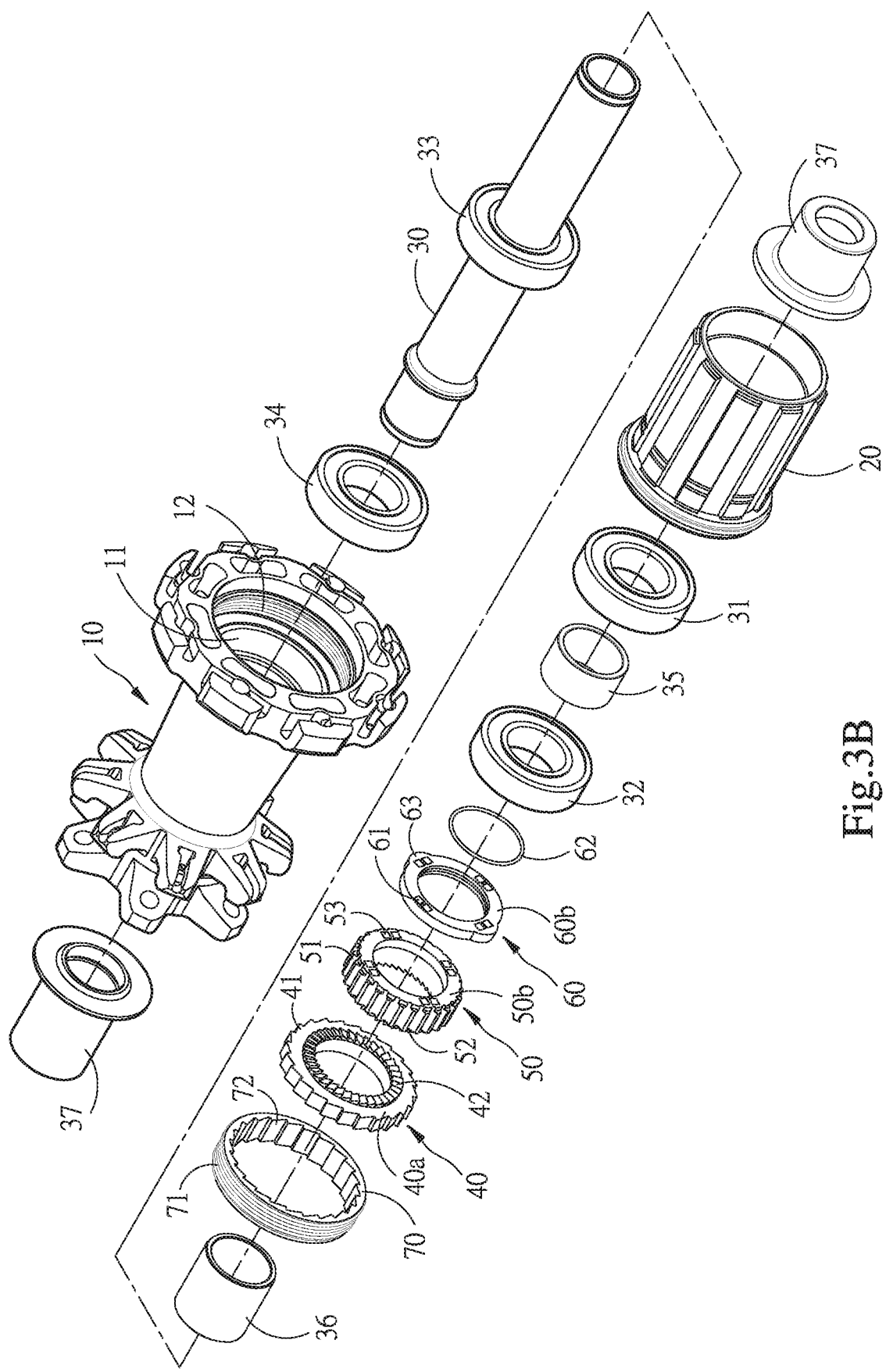
FIG. 3B is an exploded stereo view from another direction according to the first embodiment of the present disclosure.

FIG. 3A and FIG. 3B are a first embodiment of the present disclosure, and with reference to FIG. 5, FIG. 6A, FIG. 7A and FIG. 9A, a bicycle hub structure is provided, including a hub body 10, a sprocket support body 20, a hub axle 30, a first clutch ring 40, a second clutch ring 50, a magnetic ring 60 and an assembly ring 70.

The hub body 10 includes a thread portion 12 on an inner periphery edge of an end 11 facing the sprocket support body 20.

The sprocket support body 20 is connected to the hub body 10, and includes an internal tooth ring 22 on an inner periphery edge of an end 21 facing the hub body 10. The sprocket support body 20 is assembled with a sprocket assembly (not shown) of a bicycle, and the sprocket assembly engages chains. When a user treads pedals of the bicycle, the chains drive the sprocket assembly and the sprocket support body 20 to rotate in a clockwise direction D1 or in a counterclockwise direction D2. At least one first convex portion 23, and at least one accommodating groove 24 hollowed opposite to the first convex portion 23 are disposed on an inner periphery edge of the sprocket support body 20 close to the internal tooth ring 22. The at least one first convex portion 23 and the at least one accommodating groove 24 are alternately disposed. The accommodating groove 24 includes a first end 24a and a second end 24b, and further, a plurality of first convex portions 23 may be equidistantly disposed on the inner periphery edge of the sprocket support body 20. In this embodiment, two first convex portions 23 are disposed opposite to each other on the inner periphery edge of the sprocket support body 20 and two accommodating grooves 24 are respectively disposed between the two first convex portions 23, and an angle between the two first convex portions 23 is 180°.

The hub axle 30 passes through the hub body 10 and the sprocket support body 20, and there are a plurality of bearings disposed between the hub axle 30 and both the hub body 10 and the sprocket support body 20. In this embodiment, the sprocket support body 20 and the hub axle 30 are connected by a first bearing 31 and a second bearing 32, and the hub body 10 and the hub axle 30 are connected by a third bearing 33 and a fourth bearing 34. A sleeve 35 is disposed between the first bearing 31 and the second bearing 32, and another sleeve 36 is disposed between the second bearing 32 and the third bearing 33. The two sleeves 35 and 36 are sleeved on the hub axle 30 in a tight-fitting manner, so as to prevent the first bearing 31, the second bearing 32 and the third bearing 33 from slipping. The hub axle 30 includes two bushings 37 respectively disposed on two ends of the hub axle 30, and the bushings 37 are configured to fix on a bicycle frame. With the foregoing structure, the bushings 37 enable the hub axle 30 to be fixed to the bicycle frame, and the plurality of bearings enable the hub body 10 and the sprocket support body 20 to rotate relative to the hub axle 30.

The first clutch ring 40 is sleeved on the sleeve 36, and is disposed inside the hub body 10. The first clutch ring 40 includes an axial side 40a facing the sprocket support body 20 and another axial side 40b opposite to the axial side 40a. A plurality of external ratchet teeth 41 are annularly disposed on an radial periphery of the first clutch ring 40, and a plurality of first ratchet teeth 42 are annularly disposed on the axial side 40a facing the sprocket support body 20. The first clutch ring 40 is magnetic, for example, is made of magnetic metal or is additionally installed with magnetic metal.

Figure 5:
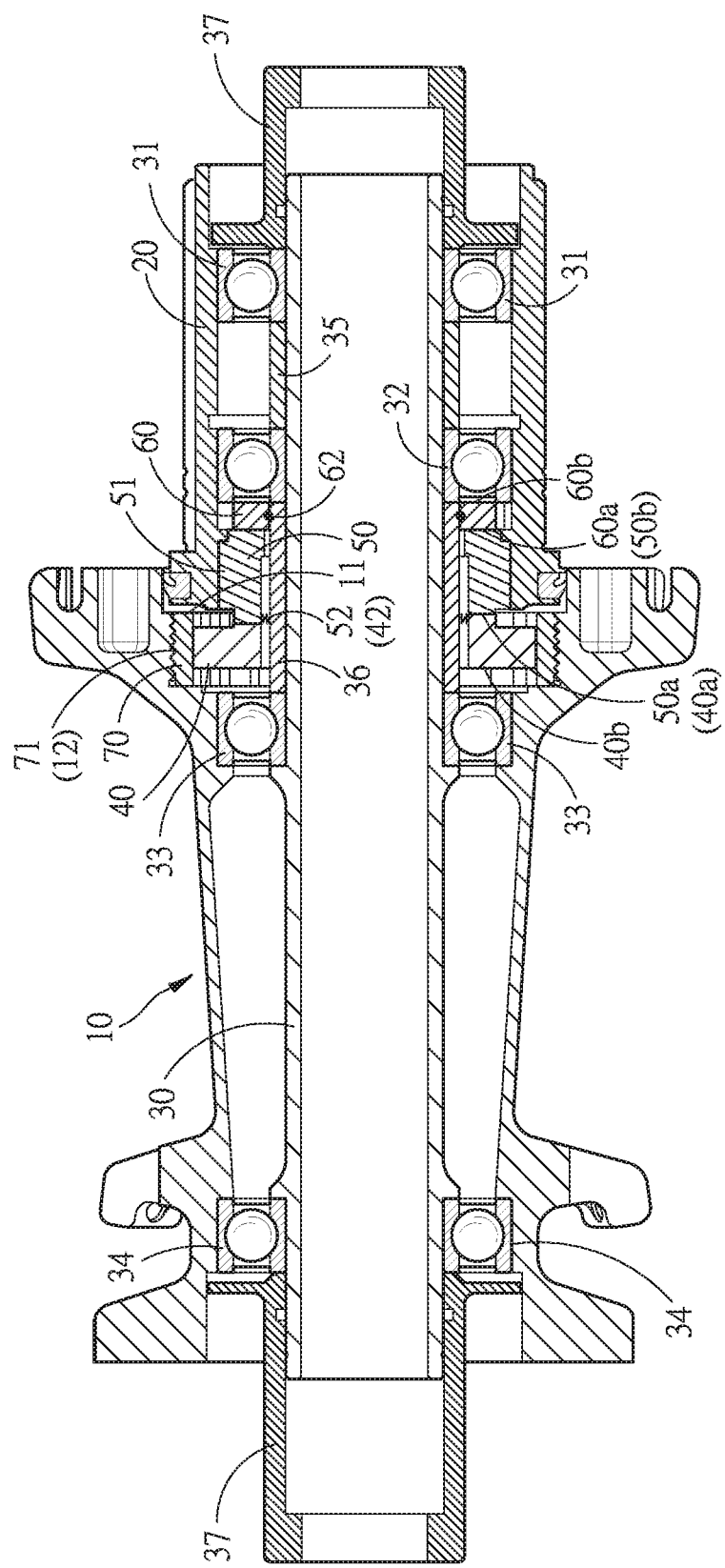
FIG. 5 is a combined sectional view according to the first embodiment of the present disclosure.
Figure 6A:
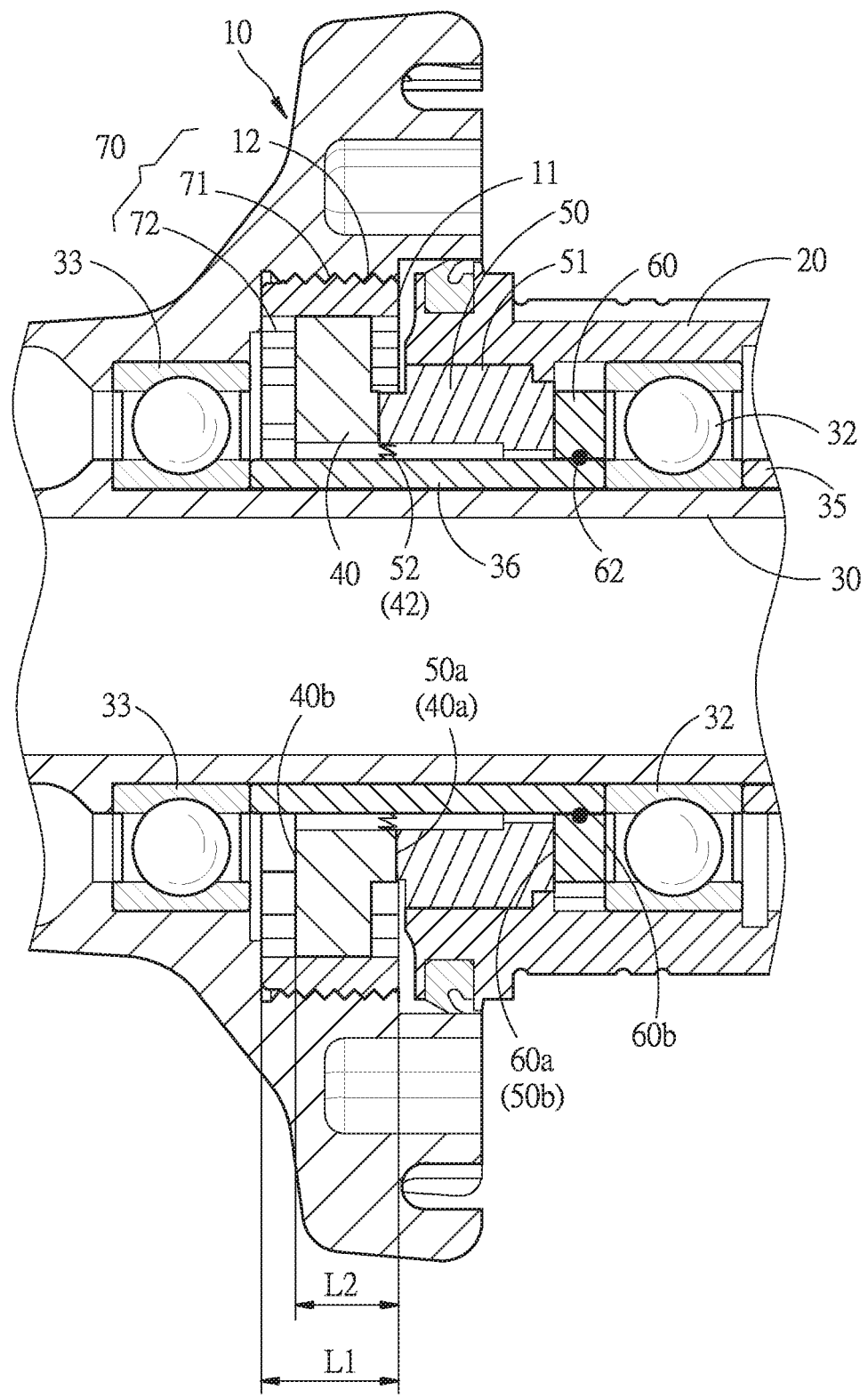
FIG. 6A is a schematic diagram of an action of treading bicycle pedals forward according to the first embodiment of the present disclosure.
Figure 6B:
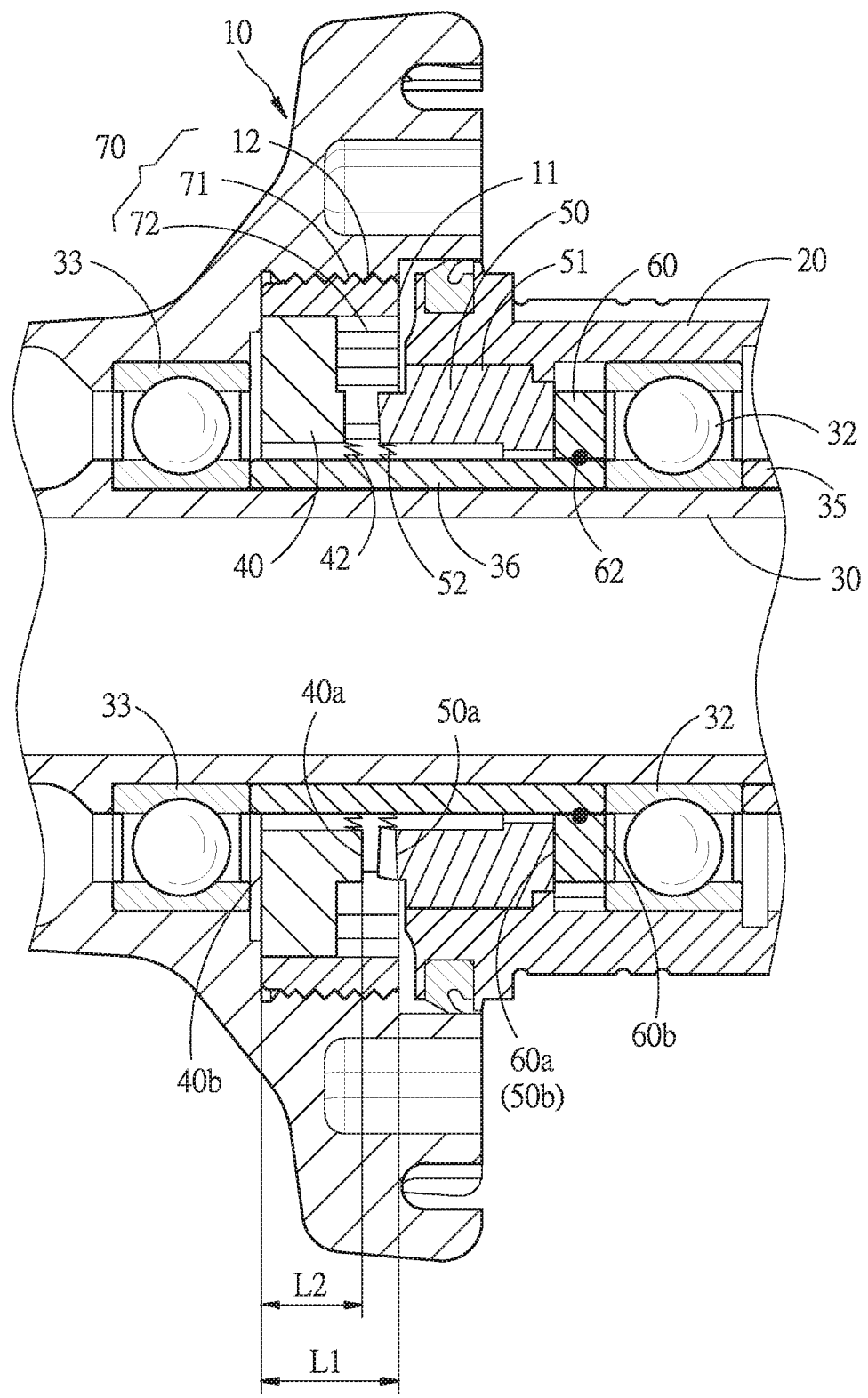
FIG. 6B is a schematic diagram of an action of treading bicycle pedals in reverse according to the first embodiment of the present disclosure.

Referring to FIG. 5 and FIG. 6A, the second clutch ring 50 is sleeved on the sleeve 36, disposed inside the sprocket support body 20 and close to the first clutch ring 40. The second clutch ring 50 includes an axial side 50a facing the hub body 10 and another axial side 50b opposite to the axial side 50a. A plurality of splines 51 are annularly disposed on an radial periphery of the second clutch ring 50, and the splines 51 engage the internal tooth ring 22 of the sprocket support body 20, so that the sprocket support body 20 can drive the second clutch ring 50 to rotate. The second clutch ring 50 having a plurality of second ratchet teeth 52 are annularly disposed on the side facing the axial side 40a of the first clutch ring 40, and the second ratchet teeth 52 engage the first ratchet teeth 42 of the first clutch ring 40, so that the second clutch ring 50 can drive the first clutch ring 40 to rotate. In this embodiment, a plurality of first magnets 53 are equidistantly embedded on an axial surface of the second clutch ring 50 facing the magnetic ring 60. One end of the first magnet 53 is an S pole, and another end is an N pole. Two adjacent ends of the plurality of first magnets 53 exert repelling forces against each other, and include a same magnetic pole.

Figure 4A:
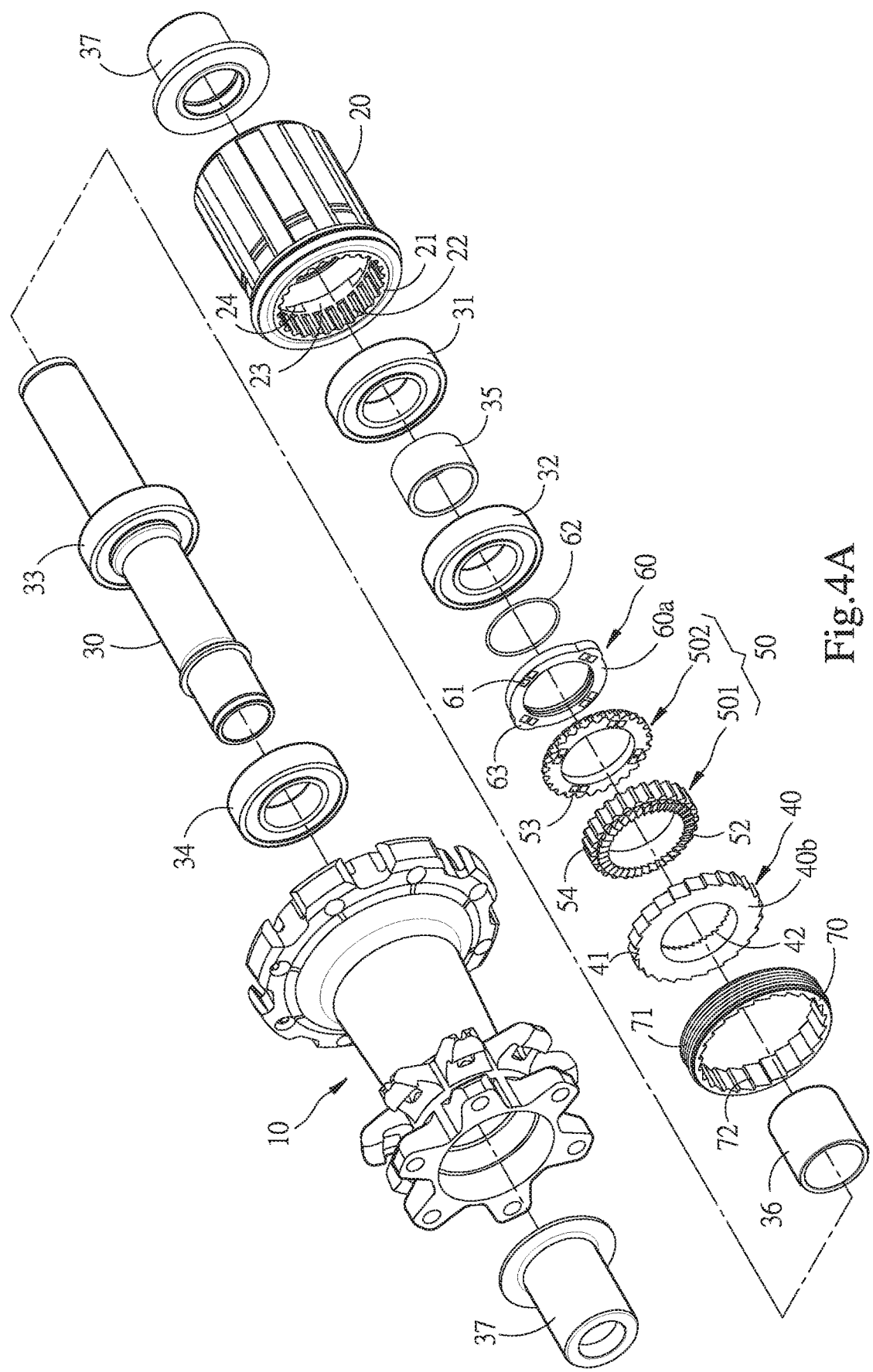
FIG. 4A is an exploded stereo view according to a second embodiment of the present disclosure.
Figure 4B:
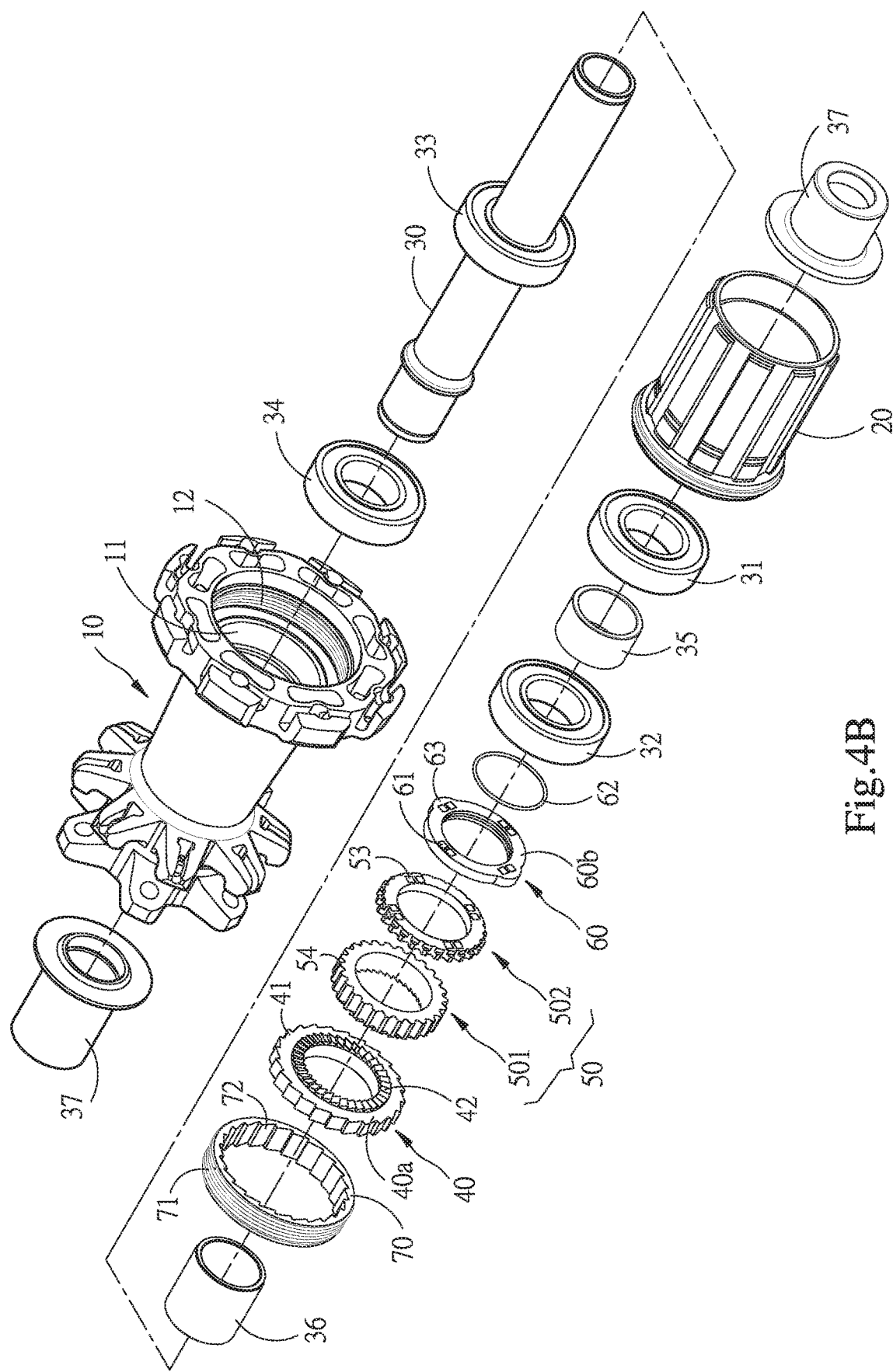
FIG. 4B is an exploded stereo view from another direction according to the second embodiment of the present disclosure.

In addition, FIG. 4A and FIG. 4B are a second embodiment of the present disclosure. The second clutch ring 50 includes a first ring body 501 close to the first clutch ring 40 and a second ring body 502 close to the magnetic ring 60. The plurality of first magnets 53 are disposed on the second ring body 502, and combines the plurality of splines 54 in the internal tooth ring 22 to rotate with the second clutch ring 50. The plurality of second ratchet teeth 52 annularly disposed on a radial surface of the first ring body 501 facing the first clutch ring 40.

Figure 7A:
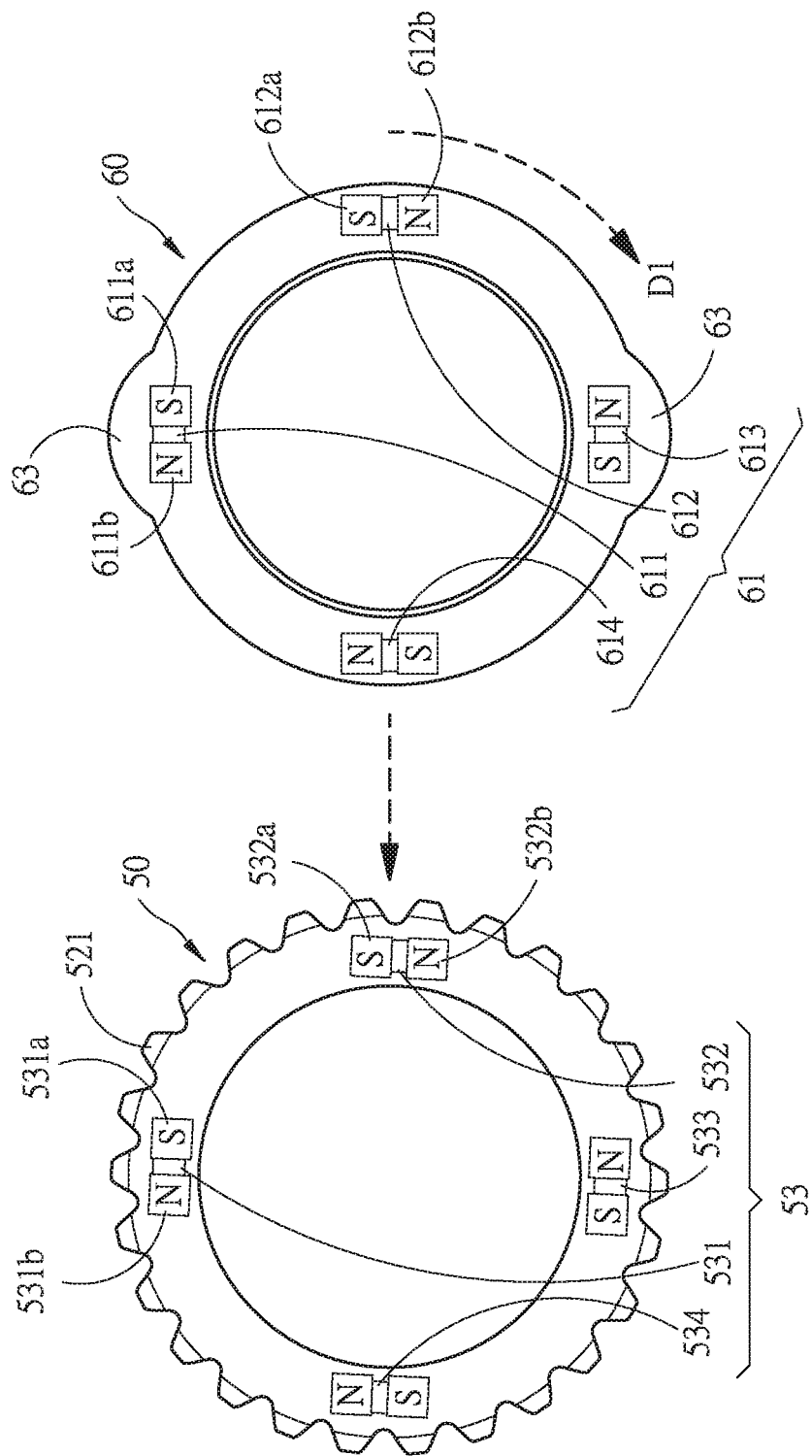
FIG. 7A and FIG. 7B are schematic diagrams of a magnetic pole matching a second clutch ring of a magnetic ring according to the present disclosure.
Figure 7B:
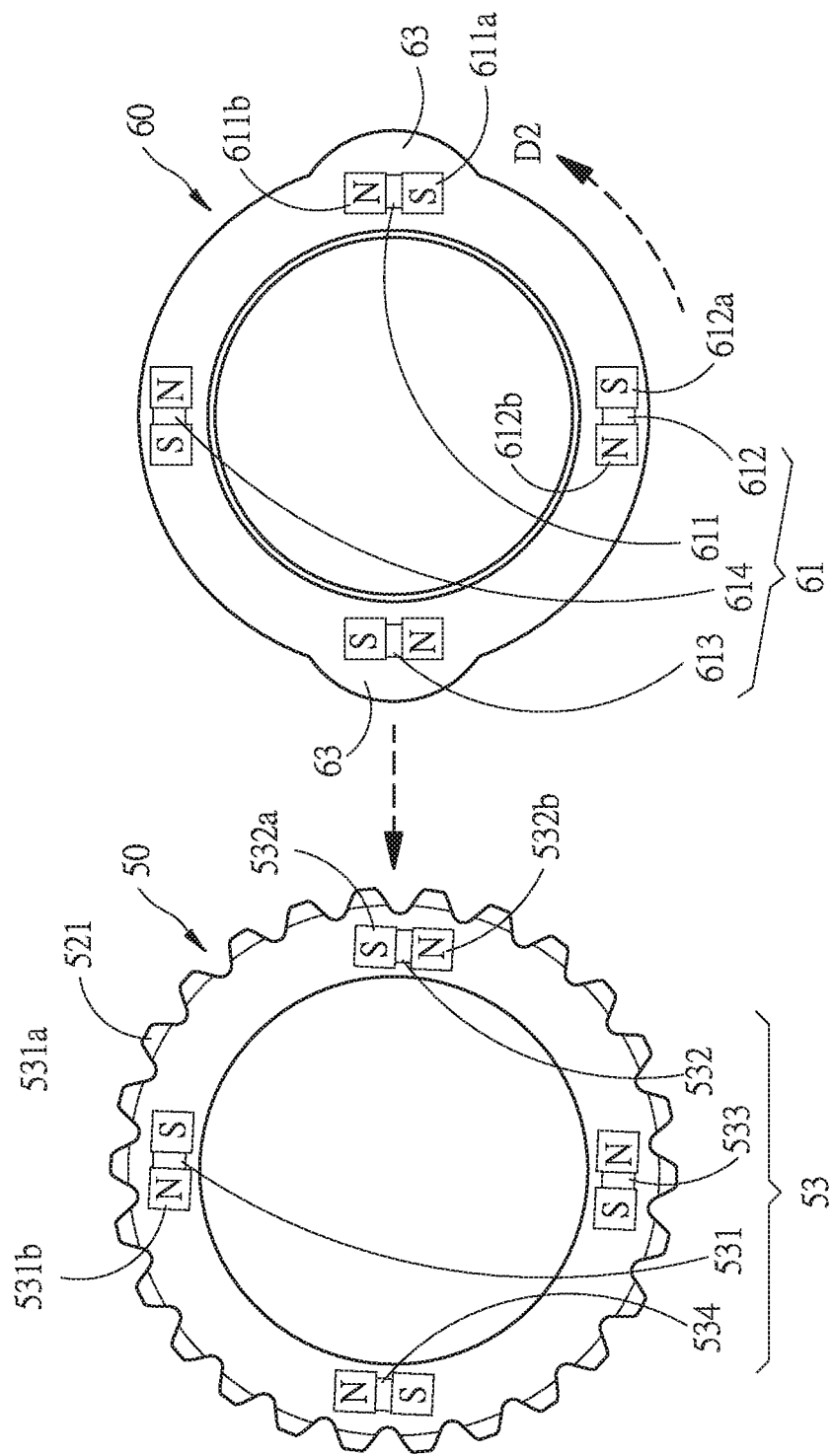
Figure 8A:
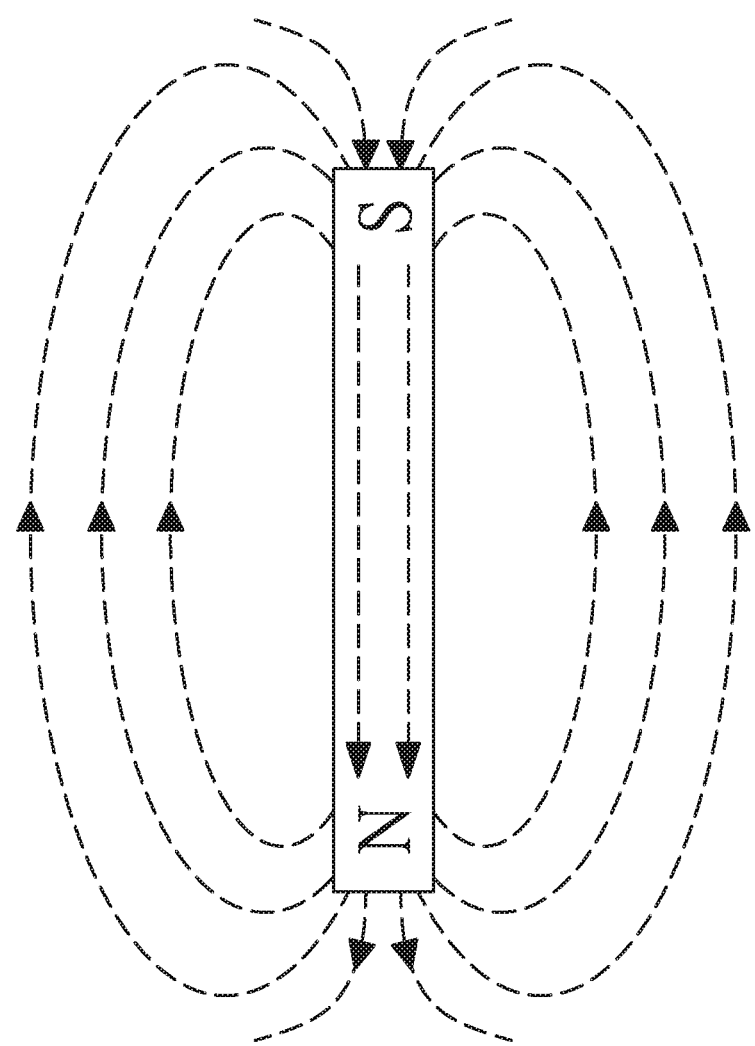
FIG. 8A is a schematic diagram of trends of magnetic lines inside a magnet.
Figure 8B:
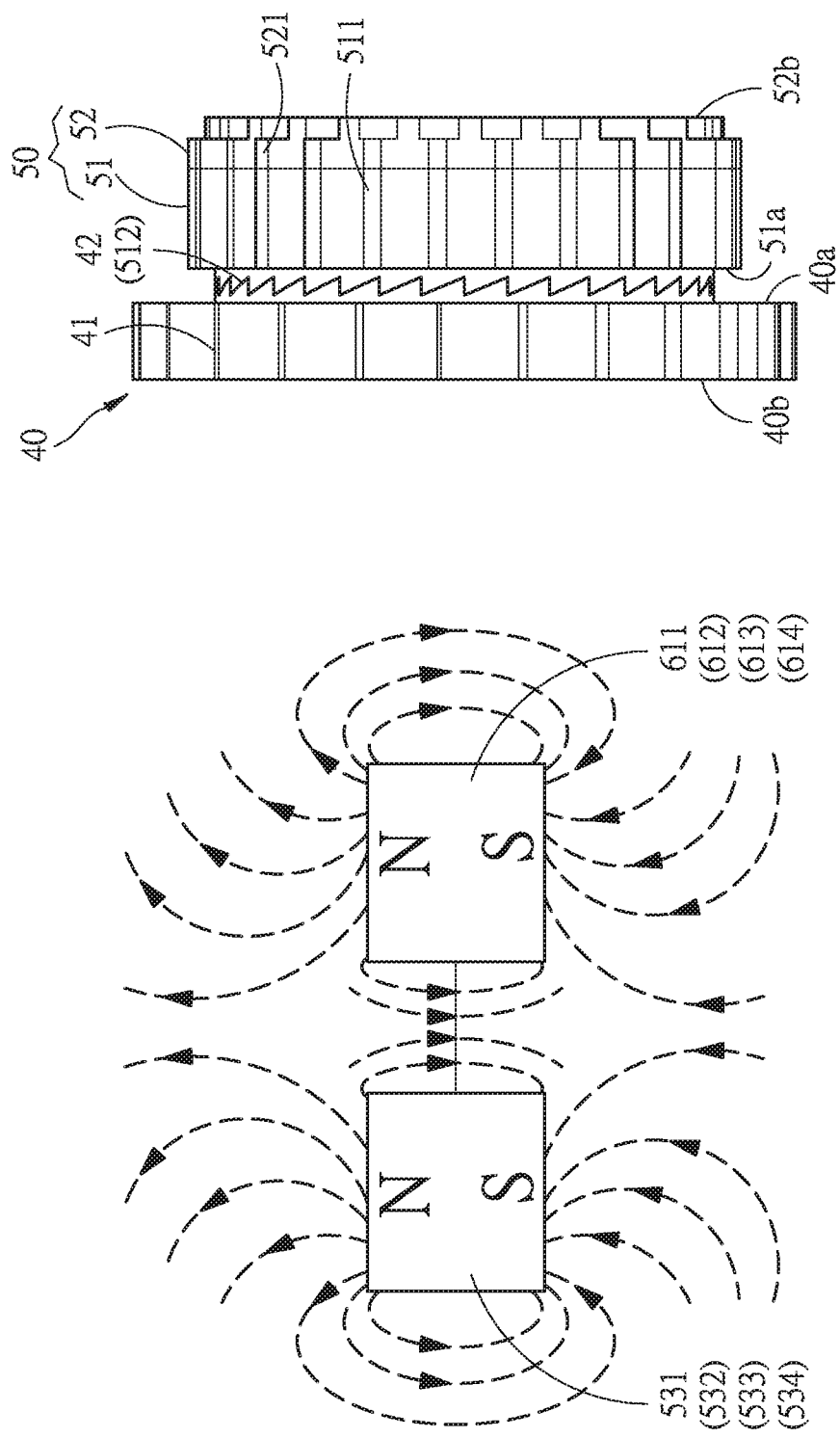
FIG. 8B is a schematic diagram of a first magnet and a second magnet exerting repelling forces against each other to attract a first clutch ring to engage a second clutch ring according to the present disclosure.
Figure 8C:
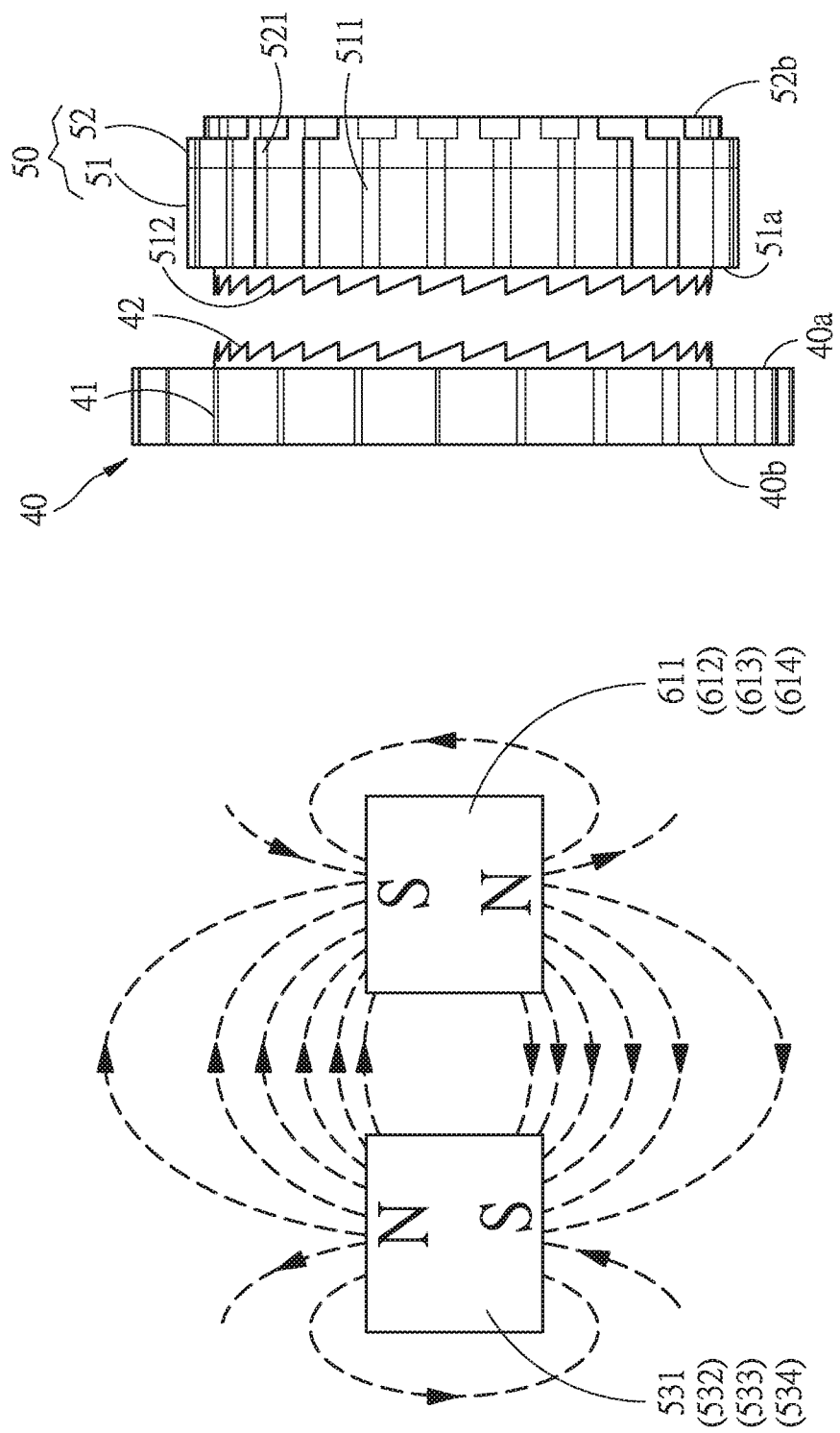
FIG. 8C is a schematic diagram of a first magnet and a second magnet exerting attracting forces on each other to separate a first clutch ring from a second clutch ring according to the present disclosure.

Referring to FIG. 7A, in this embodiment, the second clutch ring 50 includes four first magnets 531, 532, 533 and 534 equidistantly and annularly disposed on the second clutch ring 50. A first end 531a of the first magnet 531 is an S pole, and a second end 531b of the first magnet 531 is an N pole. Another first magnet 532 is close to the first magnet 531, a first end 532a of the another first magnet 532 is close to the first end 531a of the first magnet 531, and a second end 532b of the another first magnet 532 is far away from the first magnet 531. The first end 532a of the another first magnet 532 is an S pole, and the second end 532b is an N pole.

The magnetic ring 60 is sleeved on a second sleeve 36, and is disposed inside the sprocket support body 20. In addition, the magnetic ring 60 is disposed between the second bearing 32 and the second clutch ring 50. The magnetic ring 60 includes an axial side 60a facing the hub body 10 and another axial side 60b opposite to the axial side 60a. A periphery edge of the magnetic ring 60 matches an inner periphery edge of the sprocket support body 20 through structures, and a plurality of second magnets 61 are annularly and equidistantly embedded on the magnetic ring 60. The plurality of second magnets 61 are disposed opposite to the plurality of first magnets 53 of the second clutch ring 50. One end of the second magnet 61 is an S pole, and another end is an N pole. Two adjacent ends of the plurality of second magnets 61 exert repelling forces against each other, and may include a same magnetic pole.

Referring to FIG. 7A, in this embodiment, the magnetic ring 60 includes four second magnets 611, 612, 613 and 614 equidistantly and annularly disposed on the magnetic ring 60, where angles between the second magnet 611, 612, 613 and 614 are 90°. A first end 611a of the second magnet 611 is an S pole, and a second end 611b of the second magnet 611 is an N pole. Another second magnet 612 is close to the first magnet 611, a first end 612a of the second magnet 612 is close to the first end 611a of the second magnet 611, and a second end 612b of the another first magnet 612 is far away from the first magnet 611. The first end 612a of the another first magnet 612 is an S pole, and the second end 612b of the another first magnet 612 is an N pole.

A friction element 62 is disposed between the magnetic ring 60 and the sleeve 36. In this embodiment, the friction element 62 is an O-shape ring, and provides a friction force between the magnetic ring 60 and the sleeve 36, so that the magnetic ring 60 does not slip because the friction element 62 is tightly fitted with the sleeve 36. The periphery edge of the magnetic ring 60 matches the inner periphery edge of the sprocket support body 20, and at least one second convex portion 63 is disposed on a periphery of the magnetic ring 60. The at least one second convex portion 63 matches the at least one accommodating groove 24 of the sprocket support body 20. In this embodiment, the magnetic ring 60 includes two second convex portions 63, respectively disposed in the two accommodating grooves 24 of the sprocket support body 20. The accommodating grooves 24 provide the second convex portions 63 with a space for a radial displacement, and an angle between the two second convex portions 63 is 180°.

An external thread 71 is disposed on a periphery of the assembly ring 70. The external thread 71 is screwed with the thread portion 12 of the hub body 10, and a plurality of internal ratchet teeth 72 are annularly disposed on an inner periphery of the assembly ring 70. The internal ratchet teeth 72 engage the external ratchet teeth 41 of the first clutch ring 40. The assembly ring 70 includes a first axial length L1, and the first clutch ring 40 includes a second axial length L2. The first axial length L1 of the assembly ring 70 is greater than the second axial length L2 of the first clutch ring 40, to provide the first clutch ring 40 with a space for an axial displacement.

During an assembly, the magnetic ring 60 is disposed inside the sprocket support body 20 and is in contact with the axial side 50b of the second clutch ring 50 far away from the hub body 10. The periphery edge of the magnetic ring 60 matches the inner periphery edge of the sprocket support body 20, and the second convex portion 63 of the magnetic ring 60 matches the accommodating groove 24 of the sprocket support body 20. The plurality of second magnets 61 of the magnetic ring 60 and the plurality of first magnets 53 of the second clutch ring 50 are disposed opposite to each other. The splines 51 on a periphery edge of the second clutch ring 50 match the internal tooth ring 22 on the inner periphery edge of the sprocket support body 20, being a first torque transmission mechanism; and the second ratchet teeth 52 of the second clutch ring 50 engages the first ratchet teeth 42 of the first clutch ring 40, being a second torque transmission mechanism. The external thread 71 of the assembly ring 70 is screwed with the thread portion 12 of the hub body 10, and the internal ratchet teeth 72 of the assembly ring 70 engage the external ratchet teeth 41 of the first clutch ring 40, being a third torque transmission mechanism. The foregoing structures are assembled in the sleeve 36 and are disposed between the second bearing 32 and the third bearing 33.

With the foregoing structures, referring to FIG. 5, FIG. 6A, FIG. 7A, FIG. 8A, FIG. 8B and FIG. 9A, when observing from a direction from the sprocket support body 20 to the hub body 10, when the pedals of the bicycle are trodden, the sprocket support body 20 is driven to rotate in a clockwise direction D1, to drive the hub body 10 to rotate with the sprocket support body 20. In this case, the plurality of first magnets 53 of the second clutch ring 50 and the plurality of second magnets 61 of the magnetic ring 60 exert repelling forces against each other, the N pole of the plurality of first magnets 53 are opposite to the N pole of the plurality of second magnets 61, and the S pole of the plurality of first magnets 53 are opposite to the S pole of the plurality of second magnets 61, so that there are more magnetic lines through the first clutch ring 40. Therefore, magnetic forces of the plurality of first magnets 53 of the second clutch ring 50 and the plurality of second magnets 61 of the magnetic ring 60 attract the first clutch ring 40, so that the first clutch ring 40 axially moves to the second clutch ring 50, and the first ratchet teeth 42 engage the second ratchet teeth 52 of the second clutch ring 50, so that the sprocket support body 20 drives the hub body 10 to rotate, to drive wheels of the bicycle to rotate forward.

When the pedals of the bicycle are not trodden, the sprocket support body 20 is not driven by chains and stops rotating, and the hub body 10 keeps rotating because of inertia and drives the bicycle to move forward. In this case, the second ratchet teeth 52 of the second clutch ring 50 are separated from the first ratchet teeth 42 of the first clutch ring 40 because of the tooth structure of the second ratchet teeth 52.

Referring to FIG. 5, FIG. 6B, FIG. 7B, FIG. 8A, FIG. 8C and FIG. 9B, when observing from the direction from the sprocket support body 20 to the hub body 10, when the pedals of the bicycle are trodden in reverse, the sprocket support body 20 is driven to rotate in a counterclockwise direction D2, to drive the hub body 10 to rotate with the sprocket support body 20 in reverse. In this case, the second convex portion 63 of the magnetic ring 60 is pushed by the first convex portion 23 of the sprocket support body 20, the plurality of second magnets 61 and the plurality of first magnets 53 exert attracting forces on each other, the N pole of the plurality of first magnets 53 are opposite to the S pole of the plurality of second magnets 61, and the S pole of the plurality of first magnets 53 are opposite to the N pole of the plurality of second magnets 61, so that there are less magnetic lines through the first clutch ring 40. Therefore, the magnetic force attracting the first clutch ring 40 to the second clutch ring 50 is reduced, so that when the first ratchet teeth 42 of the first clutch ring 40 are pushed by the second ratchet teeth 52 of the second clutch ring 50 and are separated apart, a contact is not restored because of a magnetic attraction, thereby reducing contacts between the first ratchet 42 of the first clutch ring 40 and the second ratchet teeth 52 of the second clutch ring 50, and reducing noise and wear generated by friction between the first ratchet teeth 42 of the first clutch ring 40 and the second ratchet teeth 52 of the second clutch ring 50.

Therefore, it can be learned that the sprocket support body 20 of the present disclosure includes a first state and a second state. In the first state, the first magnets 531, 532, 533 and 534 of the second clutch ring 50 and the second magnets 611, 612, 613 and 614 of the magnetic ring 60 exert repelling forces against each other, and the first clutch ring 40 may be attracted by increasing the magnetic lines through the first clutch ring 40, so that the first clutch ring 40 is in contact with the second clutch ring 50, and torque may be transmitted from the sprocket support body 20 to the hub body 10 through the second clutch ring 50 and the first clutch ring 40. In the second state, a magnetic attracting force of the plurality of first magnets 53 and the magnetic ring 60 on the first clutch ring 40 is less than that in the first state, and the magnetic force attracting the first clutch ring 40 to the second clutch ring 50 is reduced. The first ratchet teeth 42 of the first clutch ring 40 are pushed by the second ratchet teeth 52 of the second clutch ring 50 and are separated apart, and the contact is not restored because of the magnetic attraction. Therefore, the friction between the first ratchet teeth 42 of the first clutch ring 40 and the second ratchet teeth 52 of the first ring body 51 is reduced.

In this embodiment, two first convex portions 23 are disposed opposite to each other on the inner periphery edge of the sprocket support body 20 and two accommodating grooves 24 are disposed between the two first convex portions 23, and an angle between the two first convex portions 23 is 180°. Two second convex portions 63 are disposed on the magnetic ring 60, the two second convex portions 63 are respectively disposed on the two accommodating grooves 24, and an angle between the two second convex portions 63 is 180°. The second clutch ring 50 includes four first magnets 531, 532, 533 and 534 equidistantly and annularly distributed on the second clutch ring 50, where angles between the first magnets 531, 532, 533 and 534 are 90°. The magnetic ring 60 includes four second magnets 611, 612, 613 and 614 equidistantly and annularly distributed on the magnetic ring 60, where angles between the second magnet 611, 612, 613 and 614 are 90°.

When the pedals of the bicycle are trodden forward, the first magnets 531, 532, 533 and 534 and the second magnets 611, 612, 613 and 614 are disposed opposite to each other. The first magnet 531 and the second magnet 611 are disposed opposite to each other, the first magnet 532 and the second magnet 612 are disposed opposite to each other, the first magnet 533 and the second magnet 613 are disposed opposite to each other, and the first magnet 534 and the second magnet 614 are disposed opposite to each other. Each of the first magnets 531, 532, 533 and 531 and each of the second magnets 611, 612, 613 and 614 exert repelling forces against each other, to increase the magnetic lines between the magnets and the first clutch ring 40.

When the pedals of the bicycle are trodden in reverse, the first convex portion 23 of the sprocket support body 20 pushes the second convex portion 63 of the magnetic ring 60 to radially move by an angle of 90°, so that the first magnets 531, 532, 533 and 534 and the second magnets 611, 612, 613 and 614 radially move by an angle of 90° to a position of the magnetic attraction. In this case, the first magnet 531 and the second magnet 614 are disposed opposite to each other, the first magnet 532 and the second magnet 611 are disposed opposite to each other, the first magnet 533 and the second magnet 612 are disposed opposite to each other, and the first magnet 534 and the second magnet 613 are disposed opposite to each other. Each of the first magnets 531, 532, 533 and 534 and each of the second magnets 611, 612, 613 and 614 exert attracting forces on each other, to reduce the magnetic lines between the magnets and the first clutch ring 40, that is, reduce the magnetic force attracting the first clutch ring 40, to further reduce noise and wear generated by the friction between the first ratchet teeth 42 of the first clutch ring 40 and the second ratchet teeth 52 of the second clutch ring 50.

Figure 1:
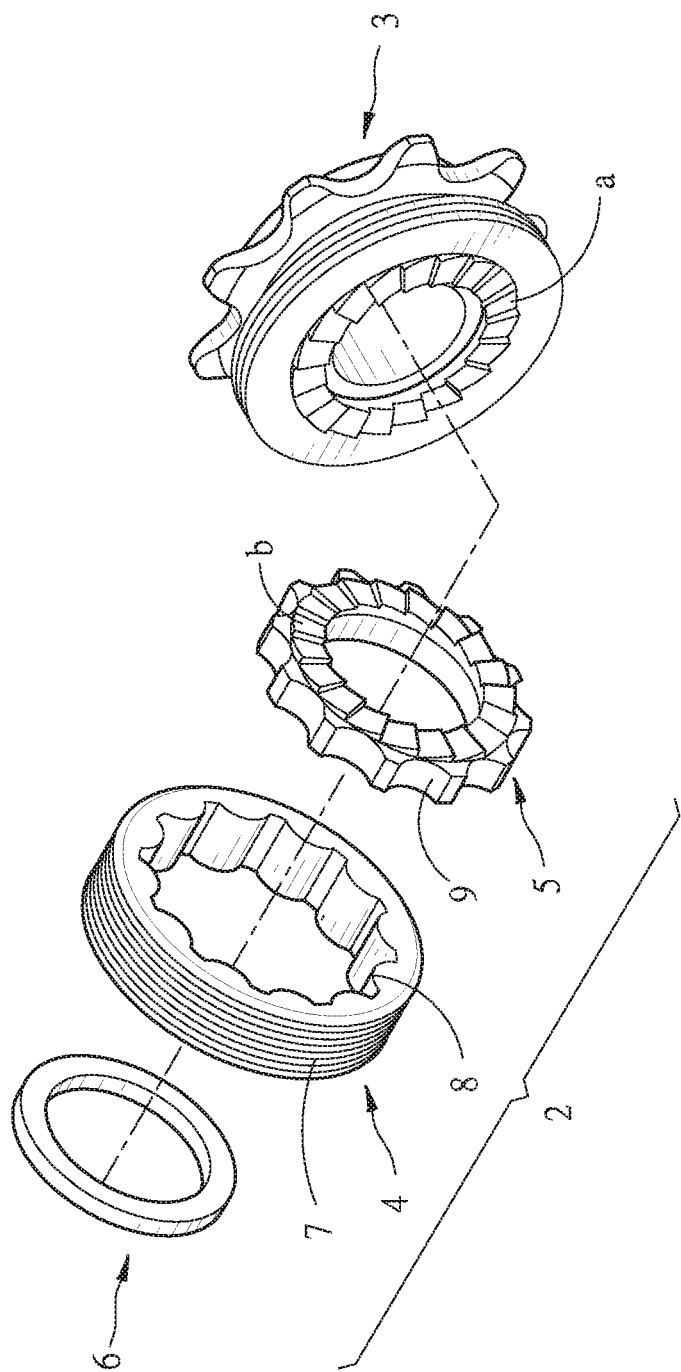
FIG. 1 is an exploded stereo view of a ratchet gear device for a bicycle rear frame according to an American patent US2009/0255774A1.
Figure 2:
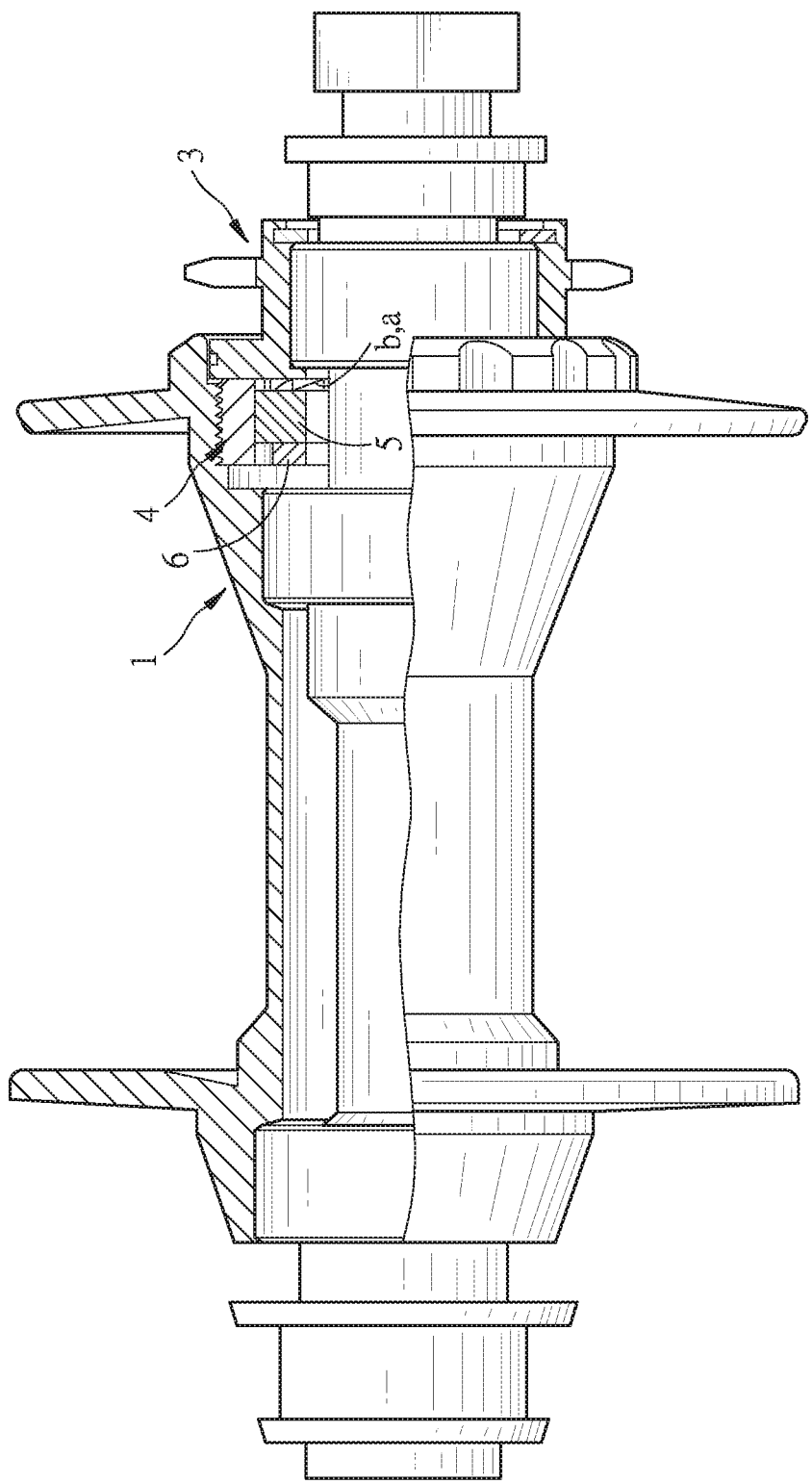
FIG. 2 is a schematic combined diagram of the ratchet gear device for the bicycle rear frame according to the American patent US2009/0255774A1.

Therefore, the present disclosure can resolve a problem as shown FIG. 1 and FIG. 2 in the related art when the pedals of the bicycle are trodden in reverse, although the permanent magnet is pushed out of the collar and moved inward to the wheel hub axle by the ratchet ring, because the collar and the ratchet ring are magnetic, the magnetic attracting force attracts the permanent magnet, so that the ratchet teeth of the ratchet ring is in contact with the wedging teeth of the freewheel, and noise and wear are generated by the friction.

The foregoing described embodiments are merely preferred embodiments used to fully describe the present disclosure, and the protection scope of the present disclosure is not limited thereto. Variations or modifications made by people skilled in the art based on the present disclosure shall fall within the protection scope of the present disclosure. The protection scope of the present disclosure is subject to the claims.

What is claimed is:

1. A bicycle hub structure, comprising:
a hub body, comprising a first clutch ring;
a sprocket support body, connecting to the hub body and comprising a second clutch ring, a plurality of first magnets and a magnetic ring, wherein the magnetic ring is disposed on an axial side of the second clutch ring far away from the hub body, and the plurality of first magnets are disposed on a side of the second clutch ring adjacent to the magnetic ring; and
a hub axle, passing through the hub body and the sprocket support body, and having a plurality of bearings disposed between the hub axle and both the hub body and the sprocket support body, wherein
a first torque transmission mechanism is disposed between the second clutch ring and the sprocket support body, and a second torque transmission mechanism is disposed between the first clutch ring and the second clutch ring;
a third torque transmission mechanism is disposed between the first clutch ring and the hub body; and
the sprocket support body comprises a first state and a second state, wherein in the first state, the first magnets and the magnetic ring attract the first clutch ring, to enable the first clutch ring to engage the second clutch ring, so that torque is transmitted from the sprocket support body to the hub body through the second clutch ring and the first clutch ring; and in the second state, a magnetic attracting force of the first magnets and the magnetic ring on the first clutch ring is less than that in the first state.

2. The bicycle hub structure according to claim 1, wherein the plurality of first magnets are equidistantly and annularly disposed on the side of the second clutch ring adjacent to the magnetic ring, a plurality of second magnets are equidistantly and annularly disposed on the magnetic ring, and the plurality of first magnets and the plurality of second magnets are disposed opposite to each other.

3. The bicycle hub structure according to claim 2, wherein polarities of two adjacent ends of two adjacent first magnets are different, and polarities of two adjacent ends of two adjacent second magnets are different.

4. The bicycle hub structure according to claim 3, wherein in the first state, the plurality of first magnets and the plurality of second magnets exert repelling forces against each other, and the plurality of first magnets and the plurality of second magnets attract the first clutch ring to engage the second clutch ring, to form the second torque transmission mechanism.

5. The bicycle hub structure according to claim 3, wherein in the second state, the plurality of first magnets and the plurality of second magnets exert attracting forces on each other, and the plurality of first magnets and the plurality of second magnets do not attract the first clutch ring.

6. The bicycle hub structure according to claim 1, wherein at least one first convex portion and at least one accommodating groove are disposed on an inner periphery edge of the sprocket support body, at least one second convex portion is disposed on the magnetic ring, and the second convex portion of the magnetic ring is disposed in the at least one accommodating groove of the sprocket support body.

7. The bicycle hub structure according to claim 6, wherein when observing from a direction from the sprocket support body to the hub body, when the sprocket support body rotates in a counterclockwise direction relative to the hub body, the first convex portion of the sprocket support body pushes the second convex portion of the magnetic ring to rotate for a radial displacement, so that the sprocket support body changes from the first state to the second state.

8. The bicycle hub structure according to claim 7, wherein a rotation direction of the sprocket support body is opposite to a rotation direction of the hub body.

9. The bicycle hub structure according to claim 6, wherein when observing from a direction from the sprocket support body to the hub body, when the sprocket support body rotates in a clockwise direction relative to the hub body, the first convex portion of the sprocket support body pushes the second convex portion of the magnetic ring to rotate for a radial displacement, so that the sprocket support body changes from the second state to the first state.

10. The bicycle hub structure according to claim 9, wherein a rotation direction of the sprocket support body is the same as a rotation direction of the hub body.

11. The bicycle hub structure according to claim 1, wherein an assembly ring is disposed on the hub body, and a periphery of the assembly ring is connected with an inner periphery of the hub body.

12. The bicycle hub structure according to claim 11, wherein the assembly ring comprises a first axial length, the first clutch ring comprises a second axial length, and the first axial length of the assembly ring is greater than the second axial length of the first clutch ring.

13. The bicycle hub structure according to claim 11, wherein an internal tooth ring is disposed on the inner periphery of the sprocket support body, a plurality of splines are disposed on the second clutch ring, the plurality of splines engage the internal tooth ring to form the first torque transmission mechanism, a plurality of first ratchet teeth are disposed on an axial side of the first clutch ring facing the sprocket support body, a plurality of second ratchet teeth are disposed on an axial side of the second clutch ring facing the hub body, the plurality of first ratchet teeth engage the plurality of second ratchet teeth to form the second torque transmission mechanism, a plurality of external ratchet teeth are disposed on a periphery of the first clutch ring, a plurality of internal ratchet teeth are disposed on an inner periphery of the assembly ring, and the plurality of external ratchet teeth engage the plurality of internal ratchet teeth to form the third torque transmission mechanism.

14. The bicycle hub structure according to claim 13, wherein the second clutch ring comprises a first ring body close to the first clutch ring and a second ring body close to the magnetic ring, the first ring body comprises an axial side facing the hub body, the second ring body comprises another axial side opposite to the axial side, and the plurality of splines are annularly disposed on radial peripheries of the first ring body and the second ring body.

15. The bicycle hub structure according to claim 14, wherein the first magnets are disposed on the second ring body.

16. The bicycle hub structure according to claim 1, wherein a sleeve is sleeved on a periphery of the hub axle, the first clutch ring, the second clutch ring and the magnetic ring are sleeved on the sleeve, and a friction element is disposed between the magnetic ring and the sleeve.

\* \* \* \* \*